United States Patent Office 3,010,268
Patented Nov. 28, 1961

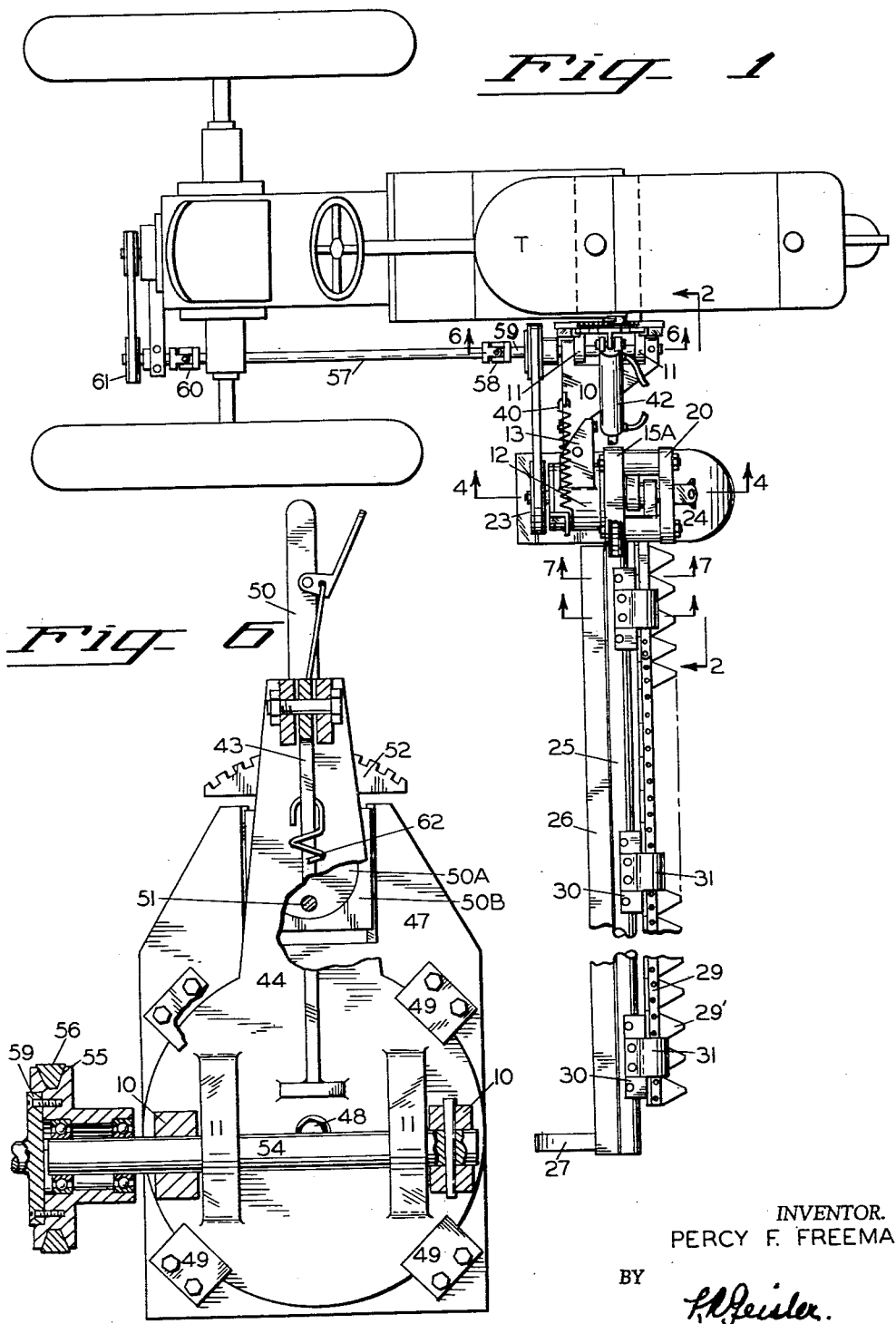

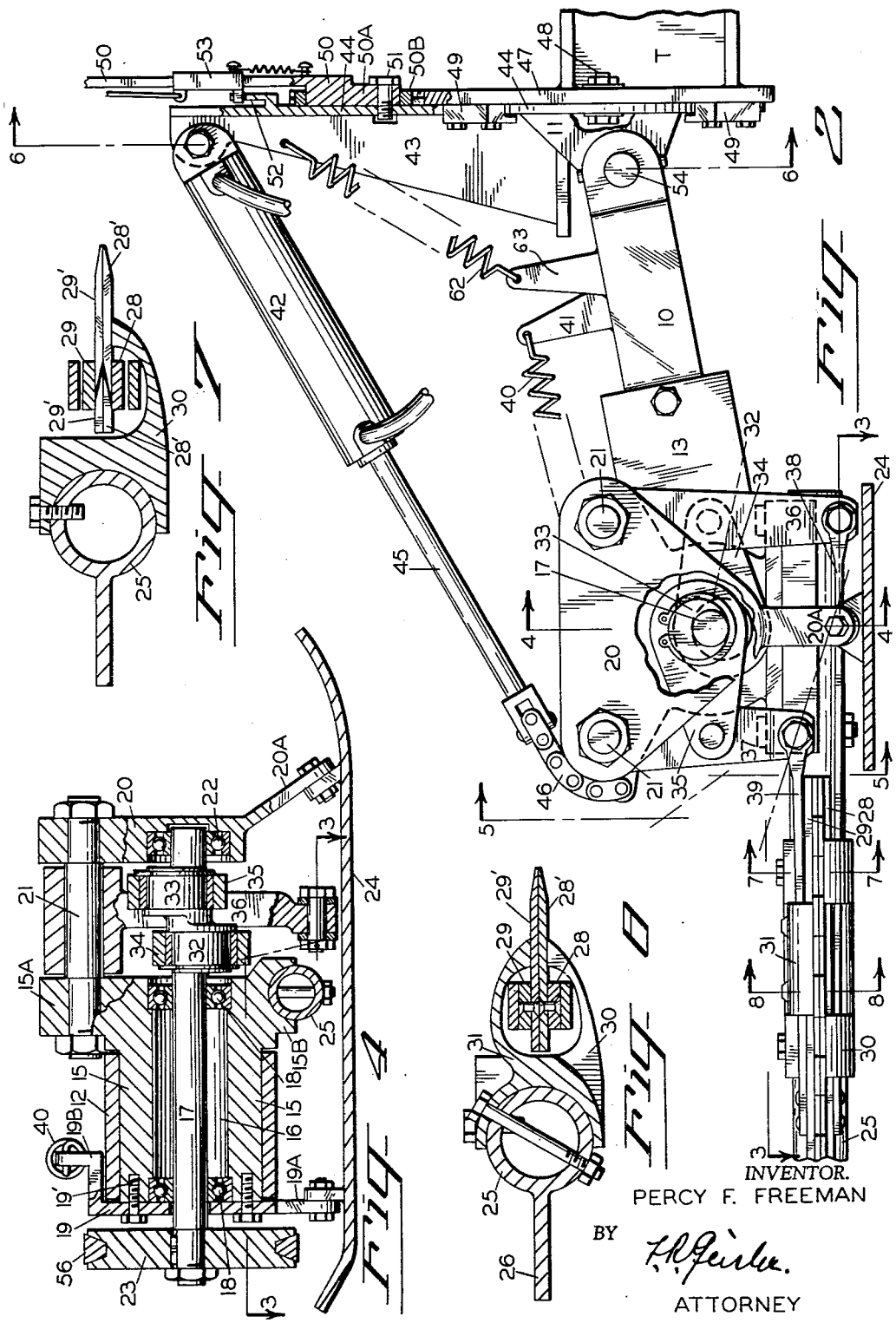

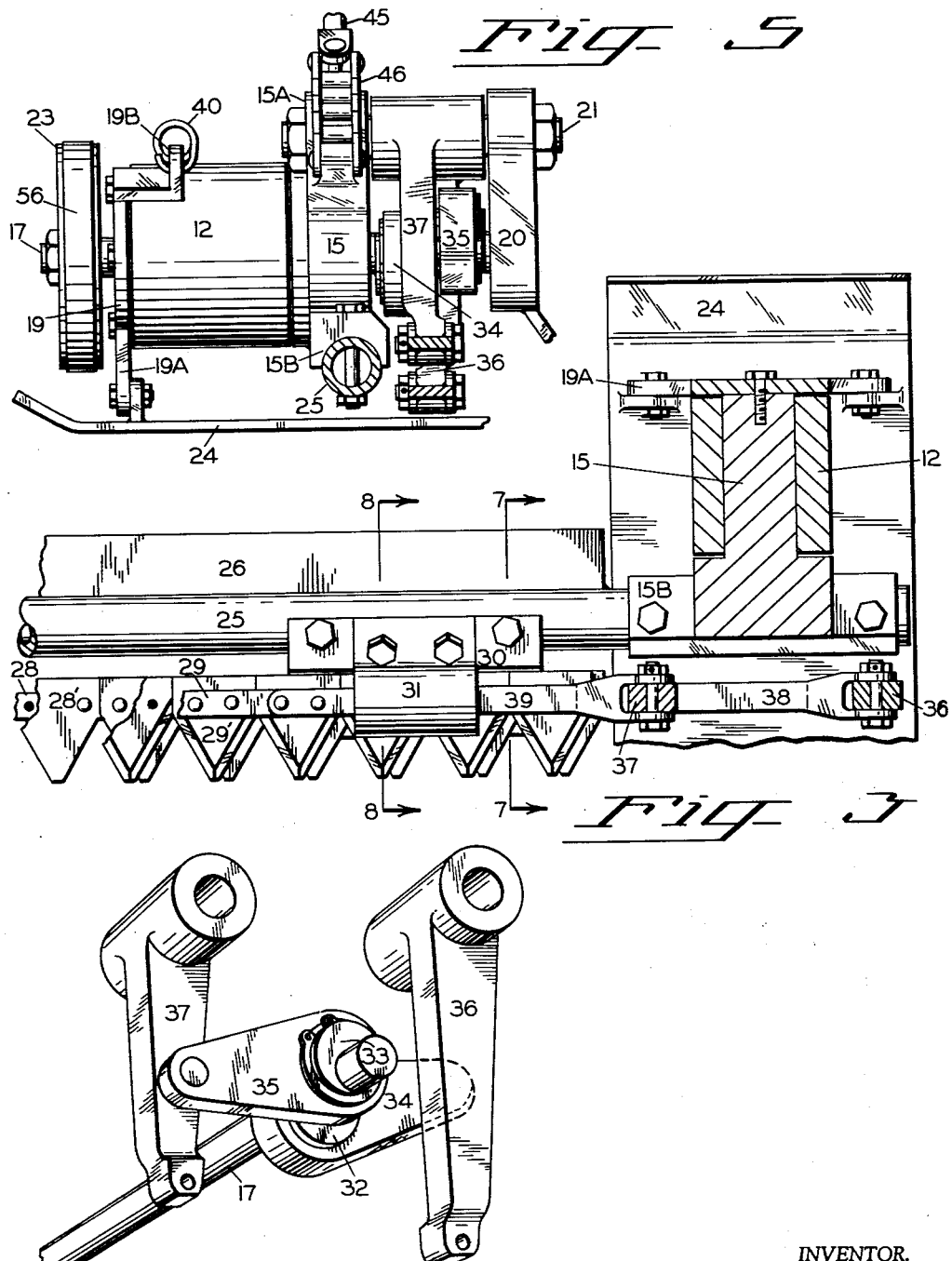

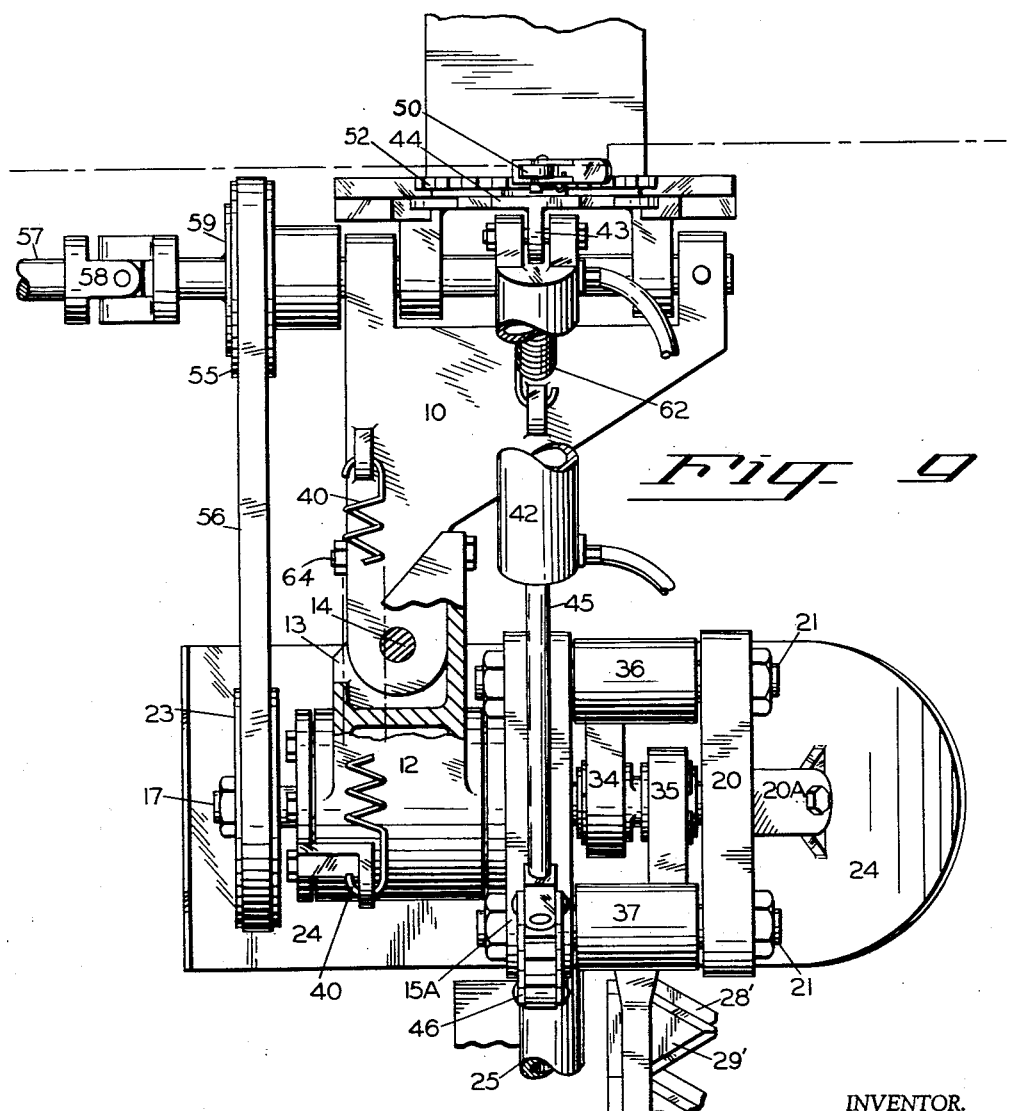

3,010,268
MOWING MACHINE WITH RECIPROCATING SICKLE BARS
Percy F. Freeman, 4061 SW. Greenleaf Drive, Portland, Oreg.
Filed Sept. 8, 1959, Ser. No. 838,771
4 Claims. (Cl. 56—25)

The present invention relates specifically to the type of mowing machines in which a pair of bars, commonly referred to as sickle bars, each bar being provided with a row of cutting teeth, reciprocate in opposite directions with respect to each other, causing the teeth on the two bars to cooperate to produce the desired cutting or mowing operation. Mowing machines of this type are to be distinguished from mowing machines in which only one toothed bar reciprocates while the cooperating companion toothed bar remains stationary. There are obvious and well known advantages in having both bars reciprocate, one advantage being that slower reciprocating speed and a shorter stroke are required when both bars are being reciprocated.

An object of the present invention is to provide a mowing machine having an improved and simplified driving mechanism for the two reciprocating sickle bars.

A related object is to provide a driving mechanism for the sickle bars which will avoid any undue wear or strain on any part of the mechanism.

A further object of the invention to to provide a reciprocating mechanism which will not cause excessive vibration to be imparted to the entire mower assembly.

Another object is to provide an improved mowing machine, having reciprocating sickle bars, with special adjusting means for positioning the sickle bars.

The means by which these objects and other incidental advantages are attained will be readily understood from the following brief description wherein reference is made to the accompanying drawings.

In the drawings:

FIG. 1 is a plan view of the mower, including the customary tractor which provides the motive and operating power;

FIG. 2 is a fragmentary elevation, partly in section, taken on line 2—2 of FIG. 1, drawn to a considerably enlarged scale;

FIG. 3 is a fragmentary sectional view taken on line 3—3 of FIG. 2;

FIG. 4 is a section on line 4—4 of FIG. 1 and line 4—4 of FIG. 2 drawn to the same scale as FIG. 2;

FIG. 5 is a fragmentary section on line 5—5 of FIG. 2;

FIG. 6 is a section on line 6—6 of FIGS. 1 and 2, drawn to the same scale as FIG. 2;

FIG. 7 is a section on line 7—7 of FIGS. 1, 2 and 3, drawn to an enlarged scale;

FIG. 8 is a section on line 8—8 of FIGS. 1, 2 and 3, drawn to the same enlarged scale;

FIG. 9 is an enlarged fragmentary view corresponding in part to FIG. 1 with portions broken away for clarity; and FIG. 10 is a fragmentary perspective detail view showing the pair of rocker arms for the sickle bars and the links connecting the rocker arms to the driving crank shaft.

Referring first to FIGS. 1, 2, and 9, a carrying member 10 is hingedly mounted on a pair of hinge brackets 11 to swing to a limited extent up and down. The hinge brackets 11 are secured on a support plate which is mounted on the tractor T by means to be explained later. A cylindrical housing 12 (FIGS. 1, 5 and 9) has an integral arm 13 (FIGS. 1, 2 and 9) which is secured to the end of the carrying member 10 by a main, substantially vertical bolt 14 (FIG. 9) and a secondary, substantially horizontal bolt 64. The reason for securing the housing 12 to the carrying member 10 in this manner will be explained later.

The cylindrical housing 12 rotatably carries a body member 15 (FIG. 4). An axial channel 16 extends through the body member 15, and a drive shaft 17 extends through and is rotatably supported in this channel 16 by means of suitable bearings 18. The shaft 17, body member 15, and the cylindrical housing 12 have a common axis. An end plate 19 it attached to one end of the body member 15 by screws 19'. The opposite end of the body member 15 has a portion 15A which extends upwardly beyond the end of the cylindrical housing 12, and a portion 15B which extends below that end of the housing 12. A substantially triangular end plate 20 (FIGS. 4 and 2) is secured to this opposite end of the body member 15, but at a spaced distance therefrom, by a pair of identical spacer pins or bolts 21 which have reduced end portions as shown in FIG. 4. The end plate 20 houses the end of the shaft 17 and carries a support bearing 22 for this end of the shaft. A drive pulley 23 is keyed on the other end of shaft 17 a slight distance from the end plate 19, as shown in FIG. 4. The end plates 19 and 20 have downwardly-extending arms 19A and 20A to which a ground shoe or runner 24 is attached (FIGS. 4 and 5).

A tubular sickle bar support member 25 (FIGS. 1, 3, 4 and 5) has its inner end rigidly secured to the lower portion 15B of the body member 15. A flat bar 26, formed integral with or welded to the tubular member 25, extends along the tubular member 25 on the rear side with respect to the direction of travel of the mower. A second runner or shoe 27 (FIG. 1) is secured at the outer end of the tubular member 25 and flat bar 26. A lower sickle bar member 28 (FIGS. 3, 7 and 8), carrying cutting teeth 28', and an upper sickle bar member 29, carrying cutting teeth 29', are slidably mounted in lower guides 30 (shown best in FIG. 7) and in upper guides 31 (shown best in FIG. 8), these pairs of guides being secured at spaced distances along the tubular sickle bar support member 25 (see also FIG. 1).

The drive shaft 17 (FIGS. 2, 4 and 10) is formed with a pair of oppositely arranged eccentric bearing mounts 32 and 33 on which links 34 and 35 are carried respectively (see also FIG. 9). A pair of rocker arms 36 and 37, supported on the pair of spacer bolts 21 respectively, are connected to the links 34 and 35, respectively. The rocker arm 36, which is slightly longer than rocker arm 37, has its lower end connected to a spring link 38, the outer end of which is attached to the lower sickle bar member 28 (FIGS. 2 and 3). Similarly the lower end of the rocker arm 37 is connected to a spring link 39, the outer end of which is attached to the upper sickle bar member 29.

As will now be apparent, rotation of the drive shaft 17 causes movement of the two rocker arms 36 and 37 and therewith opposite reciprocation of the lower and upper sickle bar members 28 and 29, the lower sickle bar member 28 traveling a slightly longer distance at each stroke than the upper sickle bar member since the rocker arm 36 is longer than the rocker arm 37. The spring links 38 and 39 enable the lower and upper sickle bar members 28 and 29 to remain entirely in their plane of travel although the lower ends of the rocker arms move in arcuate paths. This simplified means for driving the two sickle bar members enables the desired reciprocation of the two sickle bars, in opposite directions with respect to each other, to be attained without any excessive vibration of the entire assembly and without any excessive wear on any particular member of the assembly. This is an important feature of this improved mower.

Since the body member 15 (FIG. 4) is rotatably supported in the cylindrical housing 12, and since the housing 12 is secured to the carrying member 10 through the integral arm 13 of the housing 12 (FIGS. 1, 2 and 9), the sickle bar support member 25, which is secured to the body member 15, and with it the two sickle bars and associated members, can be swung up and down to a limited extent with respect to the carrying member 10 on a substantially horizontal axis co-axial with a drive shaft 17. A coil spring 40 (FIGS. 2 and 4), having one end attached to an extension 19B of the end plate 19 on the body member 15, and the other end attached to an upwardly extending lug 41 on the carrying member 10, exerts a constant pull tending to swing the sickle bar assembly upwardly in clockwise direction from the operating position shown in FIG. 2, and, by counterbalancing part of the weight of the sickle bar assembly, enables the assembly to be swung upwardly without excessive force being required. A hydraulic cylinder 42 has one end pivotally attached to a rib 43 of a support plate 44 mounted on the tractor. The piston rod 45 from the piston in the hydraulic cylinder is connected by chain linkage 46 to the body member 15 so that the hydraulic cylinder and piston can be operated to swing the sickle bar assembly up and down. The hydraulic cylinder 42 is connected to customary hydraulic power means through a suitable control (not shown) located on the tractor.

The support plate 44 (FIGS. 2 and 6) is carried on an upright mounting bracket 47 which is rigidly secured to the frame of the tractor T by any suitable means. As shown in FIG. 6, the support plate 44 has a lower portion, the perimeter of which constitutes a substantial portion of a circle, and an upper portion extending upwardly from the lower circular portion. The plate 44 is attached to the mounting bracket 47 by a pivot bolt 48, located centrally in the lower portion, and by retaining lugs 49 which are attached to the mounting bracket 47 and which extend over the circular periphery of the lower portion of the plate 44. This enables the plate 44 to be rotated slightly on the bolt 48. A lever arm 50 has an off-set circular lower portion 50A rotatably supported in a slide 50B. The slide 50B is slidable up and down in a slot in the mounting bracket 47, the slide 50B having a circular opening which accommodates the circular off-set portion 50A of the lever arm 50. The lever arm 50 is attached to the plate 44 by the pivot bolt 51, this bolt being eccentrically positioned in the circular off-set portion 50A of the lever arm. Consequently movement of the upper end or handle portion of the lever arm 50 to one side or the other from the vertical position shown in FIG. 6 will cause the plate 44 to be tipped slightly from the normal position. A quadrant 52, secured on the rear face of the plate 44, is adapted to be engaged by a spring-controlled latch member 53 (FIG. 2) on the lever arm so as to hold the plate 44 against inadvertent movement with respect to the stationary mounting bracket 47.

As mentioned previously, the carrying member 10, on which the body member 15 and therewith the entire sickle bar assembly are carried, is pivotally mounted on the hinge brackets 11 (FIGS. 2 and 6) secured to the support plate 44. The hinge shaft 54 for the carrying member 10 will normally be in a substantially horizontal position shown in FIG. 6. However, by adjusting the plate 44 through the medium of the lever arm 50, the hinge shaft 54, and therewith the carrying member 10 and the entire sickle bar assembly, can be tilted slightly so as to cause the cutting teeth 28' and 29' to extend slightly downwardly towards the ground over which the sickle bar assembly is moving, or slightly upwardly away from the ground. This enables the mower to be adjusted for cutting closer to or further from the ground as may be desired. This is another important feature of the invention.

A driven belt pulley 55 (FIGS. 6 and 9) is mounted by suitable bearings on the end of the hinge shaft 54 and is connected by the belt 56 with the pulley 23 which is keyed to the shaft 17 (FIG. 4). A power take-off shaft 57 (FIGS. 1 and 9) has a universal joint connection 58 with an end member 59 which is secured to the pulley 55. The other end of the power take-off shaft 57 has a universal joint connection 60 (FIG. 1) with a stub shaft on which a pulley 61 is keyed, which pulley in turn is driven by belt connection with the tractor motor.

The arm 13 of the housing 12 (FIG. 9) is connected to the carrying member 10 by the main bolt 14 and supplementary bolt 64 as previously described, the bolts being substantially vertical and horizontal respectively. Should the sickle bars encounter an obstacle, causing a sudden shock to be applied to the sickle bar assembly, the supplementary bolt 64 will be sheared off and thus enable the assembly to be swung back on the bolt 14.

A coil spring 62 (FIG. 2) has one end attached to the rib 43 of the support plate 44 and the other end attached to an upstanding lug 63 on the carrying member 10. The spring 62 is under tension at all times and exerts a force tending to swing the member 10 upwardly to the extent permitted by the bottom end of the rib 43. When the hydraulic cylinder 42 is actuated to raise the sickle bar assembly, the lifting of the weight of the assembly by the hydraulic piston causes the carrying member 10 to be raised by its spring 62, so that when the sickle bar assembly is swung to raised inoperative position on the axis of the body member 15, the carrying member 10 will also be swung upwardly to a limited extent, thus causing the entire assembly to be located sufficiently above the ground to enable the tractor T to carry the assembly without danger of encountering ordinary ground obstructions.

I claim:

1. In a mowing machine of the character described having a rotatably mounted member with sickle bar support means secured thereto and a pair of reciprocating sickle bars carried by such support means, a drive shaft journalled in the rotatably mounted member and co-axial with the axis of rotation of said member, a pair of oppositely positioned eccentric bearing mounts on said shaft, a pair of rocker arms pivotally mounted on said member to swing in planes perpendicular to the axis of said member and shaft, means connecting said bearing mounts with said rocker arms respectively and causing said rocker arms to reciprocate in opposite directions with respect to each other with the rotation of said shaft, and means connecting said rocker arms with the sickle bars respectively, whereby the reciprocation of said sickle bars in opposite directions with respect to each other will be attained without excessive vibration of said member or associated parts.

2. The combination set forth in claim 1 with the means connecting said rocker arms with said sickle bars consisting of a pair of flat spring links.

3. In a mowing machine of the character described including a vehicle and a sickle bar assembly supported from the vehicle and provided with a pair of reciprocating sickle bars, an upright support plate mounted on the side of the vehicle for limited rotational movement in a substantially vertical plane, a carrying member hinged to said support plate for up and down movement, a housing at the outer end of said carrying member, a body member rotatably mounted in said housing on an axis parallel to the axis of the hinge connecting said carrying member with said upright support plate, a drive shaft journalled in said body member and co-axial with the axis of rotation of said body member, sickle bar support means carried by said body member, a pair of sickle bars slidably mounted on said sickle bar support means, a pair of oppositely positioned eccentric bearing mounts on said drive shaft, means connecting said sickle bars with said bearing mounts respectively, whereby to cause said sickle bars to reciprocate in opposite directions with respect to each other upon the rotation of said drive shaft, and means for imparting desired limited rotation to said upright support plate on said vehicle, whereby to tilt said carrying member, housing, body member and sickle bars transversely with respect to the longitudinal reciprocal motion of said sickle bars.

4. The combination set forth in claim 3 with said means connecting said sickle bars with said eccentric mounts of said drive shaft comprising a pair of rocker arms pivotally mounted on said rotatable body member to swing in planes perpendicular to the axis of rotation of said body member and to said shaft with means connecting said rocker arms with said eccentric mounts respectively, and link members connecting said rocker arms with said sickle bars respectively.

References Cited in the file of this patent
UNITED STATES PATENTS

| | | |
|---|---|---|
| 2,823,506 | Irving | Feb. 18, 1958 |
| 2,932,931 | Elfes et al. | Apr. 19, 1960 |